(12) United States Patent
Lundquist et al.

(10) Patent No.: US 8,997,545 B1
(45) Date of Patent: Apr. 7, 2015

(54) METHOD AND APPARATUS FOR IMPACTING METAL PARTS FOR AEROSPACE APPLICATIONS

(71) Applicant: The Boeing Company, Chicago, IL (US)

(72) Inventors: Lauren K. Lundquist, Maple Valley, WA (US); James E. Pillers, Seattle, WA (US); McKay A. Kunz, South Prairie, WA (US); Michael Delos McGraw, Bonney Lake, WA (US); Gregory L. Ramsey, Seabeck, WA (US); Nate Speer, Bonney Lake, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/031,690

(22) Filed: Sep. 19, 2013

(51) Int. Cl.
*B21D 1/06* (2006.01)
*B21D 31/06* (2006.01)

(52) U.S. Cl.
CPC ............... *B21D 31/06* (2013.01); *Y10S 72/705* (2013.01)

(58) Field of Classification Search
CPC .................................... B21D 1/12; B21D 1/06
USPC ................. 72/452.5, 453.16, 453.17, 705
See application file for complete search history.

(56) References Cited

U.S. PATENT DOCUMENTS

| | | | |
|---|---|---|---|
| 2,483,626 A * | 10/1949 | Elek Daku | 72/705 |
| 3,705,511 A * | 12/1972 | Brandel et al. | 72/53 |
| 4,349,074 A | 9/1982 | Ince | |
| 4,416,130 A | 11/1983 | Judge, Jr. | |
| 4,937,421 A | 6/1990 | Ortiz et al. | |
| 5,119,667 A * | 6/1992 | Hollis et al. | 72/453.16 |
| 5,742,028 A | 4/1998 | Mannava et al. | |
| 5,771,729 A | 6/1998 | Bailey et al. | |
| 6,014,885 A * | 1/2000 | Griffaton | 72/453.16 |
| 6,410,884 B1 | 6/2002 | Hackel et al. | |
| 6,664,506 B2 | 12/2003 | Clauer et al. | |
| 6,670,578 B2 * | 12/2003 | Hackel et al. | 219/121.85 |
| 6,698,268 B2 | 3/2004 | Woods et al. | |
| 6,742,377 B2 | 6/2004 | Woods et al. | |
| 6,862,913 B2 * | 3/2005 | Lempenauer et al. | 72/710 |
| 6,932,876 B1 | 8/2005 | Statnikov | |
| 7,431,779 B2 | 10/2008 | Statnikov | |
| 8,302,450 B2 | 11/2012 | Slattery et al. | |
| 8,316,524 B1 * | 11/2012 | LeMieux | 72/466.5 |
| 8,323,427 B1 | 12/2012 | Slattery et al. | |
| 2002/0096504 A1 * | 7/2002 | Hackel et al. | 219/121.85 |

OTHER PUBLICATIONS

DeBoer, Clint "How's It Work? Rotary Hammers", published on ProTool Reviews vol. 1 Issue 3 May 2013.

(Continued)

*Primary Examiner* — David B Jones
(74) *Attorney, Agent, or Firm* — Kunzler Law Group, PC (57) ABSTRACT

An apparatus and method are provided for changing physical characteristics of a workpiece which may have been preloaded before being further processed. The workpiece is supported in a fixed position during processing. A driven member applies multiple impacts to one surface of the workpiece. The driven member is operated within adjustable parameters. A controller, having the adjustable parameters, is operatively connected to the driven member for causing the driven member to apply multiple impacts against a surface of the workpiece while under the control of the pre-adjustable parameters for changing physical characteristics of the workpiece.

27 Claims, 4 Drawing Sheets

(56) References Cited

OTHER PUBLICATIONS

DeWalt Product Service website Model D25831 http://servicenet.dewalt.com/Products/Detail?productNumber=D25831K.

Didier, Will, "Development and Validation of a Mathematical Model for Predicting the Performance of Rotary Hammer Drills" (2013). University of Wisconsin Milwaukee UWM Digital Commons Theses and Dissertations. Paper 88.

\* cited by examiner

METHOD AND APPARATUS FOR IMPACTING METAL PARTS FOR AEROSPACE APPLICATIONS

CROSS-REFERENCE TO RELATED APPLICATIONS/INCORPORATION BY REFERENCE

This application is a related application to a United States patent application, entitled "Control Feedback Loop for Real-Time Variable Needle Peen Forming," filed on even date herewith, namely Sep. 19, 2013, under U.S. patent application Ser. No. 14/031,771, which application is also incorporated by reference into this application entitled "METHOD AND APPARATUS FOR IMPACTING METAL PARTS FOR AEROSPACE APPLICATIONS".

FIELD

The disclosure relates to the use of mechanical systems to change physical characteristics of metal parts. More specifically, the disclosure relates to a method and apparatus for mechanically processing, such as by impact peening metal workpieces into final metal components for aircraft and aerospace applications.

BACKGROUND

Currently, metal parts are fabricated from sheet and plate product forms into, but not limited to, fuselage skins, wing skins, and structural areas for aircraft by using systems including shot peening, ultrasonic peening, and laser peening. Shot peening works well on thinner material but is difficult to control, as when precision processing of a part is required. For thicker materials, large shot is required to process the part. Large shot may damage the surface of the part to the point where additional processing steps may be required to meet surface finish requirements. Ultrasonic peening and laser peening are used on both thick and thin metal components, but such systems require a substantial amount of time to process the metal components into the desired final condition. Laser peening requires high investment levels for both initial capital and later recurring costs. A need exists for providing an easily adjustable mechanical system to process components varying from thin sheet metal to those greater than one inch thick, wherein precise finishing of such metal components may be achieved more economically than presently available.

Further limitations and disadvantages of conventional and traditional approaches will become apparent to one of skill in the art, through comparison of such systems with the present disclosure as set forth in the remainder of the present application with reference to the drawings.

BRIEF SUMMARY

In one aspect of the disclosure, an apparatus is provided for changing physical characteristics of a metal workpiece. A support is provided for securing the workpiece in position during processing. A driven member applies multiple impacts to a surface of the workpiece. The driven member is operated within adjustable parameters. A controller, having the adjustable parameters, is operatively connected to the driven member for causing the driven member to apply multiple impacts against the surface of the workpiece while under the control of and/or within a range of the adjustable parameters for changing physical characteristics of the metal workpiece.

In another aspect of the disclosure, a method is provided for changing the characteristics of a metal workpiece having a surface. The workpiece is supported in position during processing. Multiple impacts are applied to the surface of the workpiece. A controller is provided having adjustable parameters. The impacts are applied within a range of the adjustable parameters for changing physical characteristics of the workpiece.

In still another aspect of the present disclosure, a method is provided for changing the desired physical characteristics or effects of a metal workpiece having a surface until a final metal component is achieved. The method involves pre-loading the workpiece for providing a preliminary contour for the workpiece. Thereafter, the workpiece is securely supported while multiple impacts are applied to the surface of the workpiece W. The multiple impact applying occurs within the range and control of adjustable parameters. The multiple impact applying is continued until the desired physical characteristics or effects are achieved for the final metal component.

The features, functions, and advantages that have been discussed can be achieved independently in various embodiments or may be combined in yet other examples, further details of which can be seen with reference to the following description and drawings.

DETAILED DESCRIPTION

Figure 14:
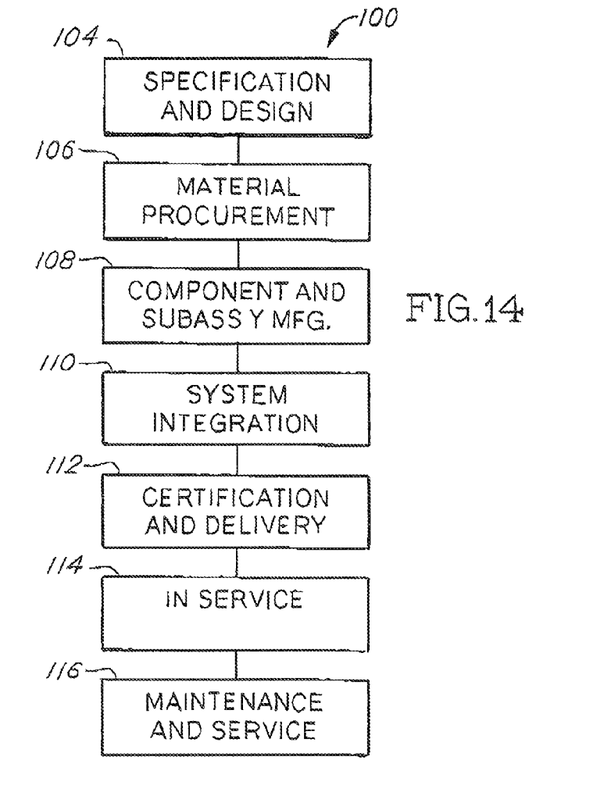
FIG. 14 is a flow diagram of aircraft production and service methodology.
Figure 15:
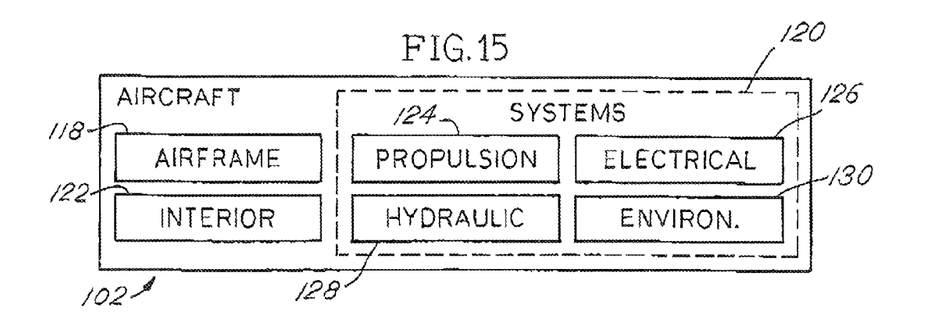
FIG. 15 is a block diagram of an aircraft.

Referring to the drawings, examples of the disclosure may be described in the context of an aircraft manufacturing and service method 100 as shown in FIG. 14 and an aircraft 102 as shown in FIG. 15. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 15, the aircraft 102 produced by exemplary method 100 may include an airframe 118 with a plurality of systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the disclosure may be applied to other industries, such as the automotive industry.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus example, method example, or a combination thereof may be utilized during the production stages 108 and 110, for example, by substantially expediting assembly of or reducing the cost of an aircraft 102. Similarly, one or more of apparatus example, method example, or a combination thereof may be utilized while the aircraft 102 is in service, for example and without limitation, to maintenance and service 116.

Referring to FIGS. 14 and 15, the description of the present disclosure to be hereinafter provided generally falls within category 108 "Component and Subass'y Mfg." and also generally falls within category 118 "Airframe."

The present disclosure is directed to an apparatus and method for changing physical characteristics of metal workpieces or parts by multiple impacts. The workpiece may be sheet metal or plate or an extrusion or an assembly and may have a thickness range of 0.062 to 2.00 inches. Each workpiece W may have different dimensions in length, width, and thickness. Each workpiece W may have multiple surfaces which receive multiple impacts. The metal itself may be any metal such as aluminum, titanium or metal alloys. In essence, the metal or metal alloy workpiece may exist in a variety of geometries and configurations.

Figures 1, 2, 3, 4, 5:
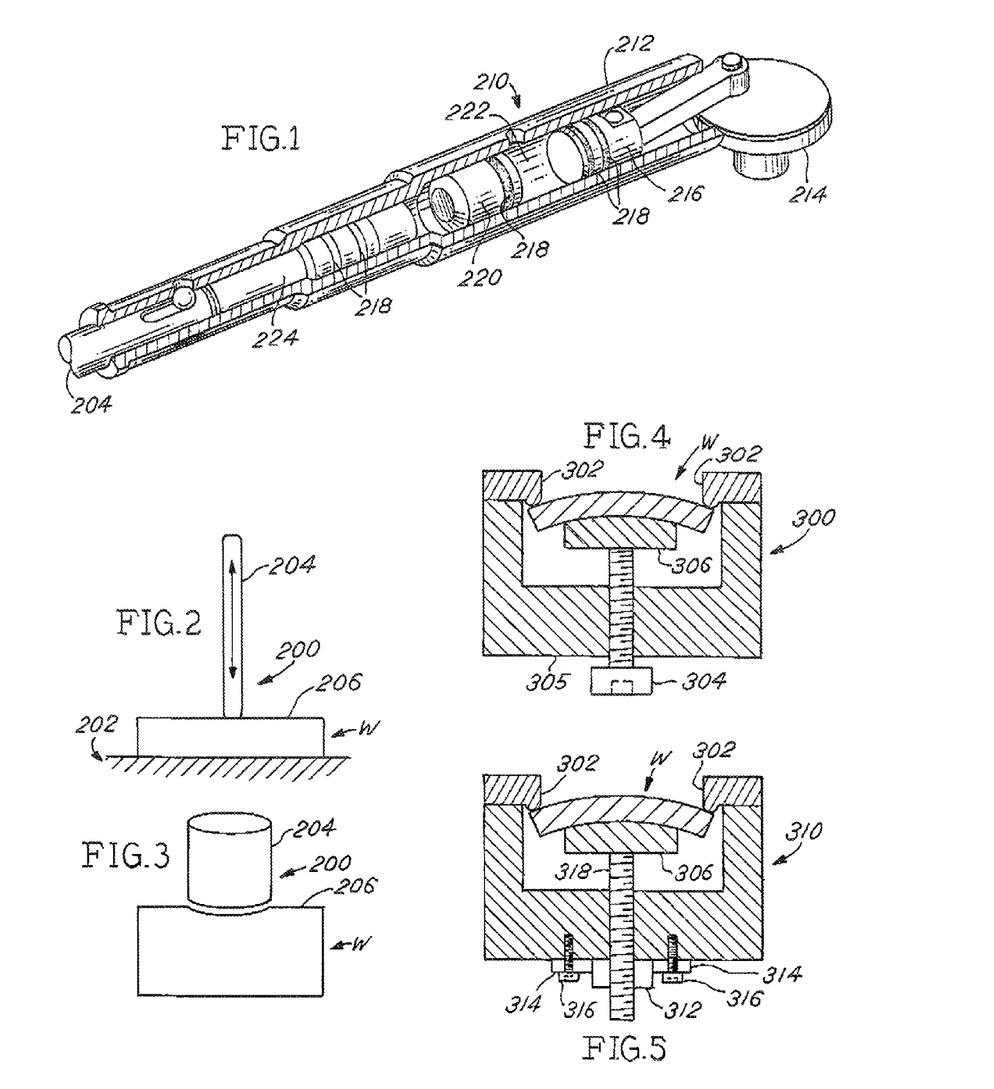
FIG. 1 is a broken-away, perspective view of the interior of one type of rotary impact device used for processing a workpiece with a driven member for achieving a final component.
FIG. 2 is a schematic view of a driven member applying impacts against a workpiece.
FIG. 3 is a schematic view of a driven member transmitting impact energy to a workpiece.
FIG. 4 is a schematic view illustrating one type of fixture for pre-loading a workpiece.
FIG. 5 is a schematic view, similar to FIG. 4, illustrating another type of fixture for pre-loading a workpiece.

Referring to FIGS. 2 and 3, an apparatus 200 is provided for changing physical characteristics of a metal workpiece. The workpiece W is securely positioned upon a support 202. Although the support 202 is shown in the accompanying drawings as being in a horizontal position, it is to be understood that the support 202 for the workpiece W may be in a substantially vertical position and virtually at any angle between the vertical and horizontal positions of the workpiece W. A driven member 204 is provided for applying multiple impacts to the surface 206 of the workpiece W. The driven member 204 desirably has a hardness greater than that of the workpiece W. The multiple impacts from the driven member 204 change physical characteristics or effects of the workpiece W until a final useful component, such as for use on an aircraft, is achieved.

As disclosed, the workpiece W may have a variety of geometries, including length. Each support 202 has certain dimensions and is able to receive and process each workpiece W. For example, in some cases, a workpiece W may be impacted in its entirety on a given support 202 by the driven member 204. In other cases, a lengthy workpiece W may be processed in consecutive sections of the same workpiece. The leading section of such a lengthy workpiece W may be processed while being secured on the support. The leading section is moved forward while adjacent trailing sections of similar dimensions are impacted in a stepwise manner.

In all of the workpieces W being processed, each workpiece W is supported in a fixed position during impacting by the driven member 204 over the entire surface 206 which is the equivalent of the impact coverage area. As to be described hereinafter in detail, the driven member 204 is controlled by a manipulator and an end effector for impacting the entire coverage area of an entire workpiece W or of each section of a lengthy workpiece W while being secured in position on a support 202.

Referring to FIG. 3, the driven member 204 applies multiple impacts to the surface 206 of a workpiece W and creates impact energy that moves as a stress wave from the driven member 204 to the surface of the workpiece W. The stress wave is then transferred from the surface 206 as an internal compressive layer within the workpiece W. The relationship of the compressive layer to the tensile layer of the workpiece W acts to change the workpiece into a component having changed physical characteristics or effects such as a desired contour for a desired final component.

The following description of the apparatus 200 provides details of one type of device 210 for driving the driven member 204 and of multiple possible types of supports 202 for the workpiece W. These descriptions will be followed by a description of the method of operation of the apparatus 200 by reference to the flow diagram shown in FIG. 13.

Referring to FIG. 1, one example of a device, generally 210, for applying multiple impacts by the driven member 204 on a workpiece W is shown. The illustrated example device 210 is electrically driven. Such a device 210 may also be driven hydraulically or pneumatically. It is to be understood that other types of devices may be utilized provided that any such other device is capable of generating and imparting an impact energy into and through the driven member 204. The illustrated device 210 is a crank mechanism and includes a housing 212. The housing 212 has a rotatable crank 214 that is connected to a shaft (not shown) connected to an electric drive motor (not shown). The crank 214 provides multiple beats per minute by the driven member 204 on the surface 206 of the workpiece W and initially provides a driving force for a piston 216. The piston 216 is reciprocally mounted within the housing 212 and has an O-ring 218 bearing against the cylindrical interior wall of the housing 212.

Spaced from the piston 216 is a ram 220, which is reciprocally mounted within the housing and has an O-ring 218 thereon. The ram 220 cooperates with the piston 216 to form an air spring 222 therebetween. The air spring 222 drives the ram 220 which accelerates a beat-piece 224. The air spring 222 drives the ram 220 against a beat-piece 224 when it is moving forward and retrieves the ram 220 when the piston 216 retracts. The beat-piece 224 includes a pair of O-rings 218 for sealing against the housing 212. The beat-piece 224 transfers energy of the ram 220 to an end of the driven member 204 which applies multiple impacts against the workpiece W. The impacts provide energy for moving a stress wave through the driven member 204 to the surface 206 of the workpiece W.

As described above, the device 210 is used to cause multiple impacts by the driven member 204 to be applied against the surface 206 of the workpiece W. Following is a discussion of multiple examples of supports 202 for the workpiece W during the impacting by the driven member 204 against the surface 206 of each workpiece W being processed regardless of the length of the workpiece W. In all cases. The driven member 204 applies impacts across the entire coverage area of the workpiece W, which is secured in position by a support 202 during the entire time that impacts are being applied.

The following description discloses various types of anvils located on the opposite side of the impacts by the driven member 204 against the surface 206 of the workpiece W. Each support 202 to be described functions as an anvil that forcibly opposes the impact side of the workpiece W away from the driven member 204. When a workpiece W is resting on a flat surface of a support 202 and is processed on the flat surface, portions of the workpiece W begin to rise off the flat surface of the support 202 and a gap forms between the flat surface and the risen portions of the workpiece W. This creates an undesired loss of energy due to the workpiece W vibrating in free air.

In essence, the supports 202 for the workpiece W, to be described in the following examples, reduce such loss of energy. Each example support 202 secures the workpiece W during processing. Each example support 202 further provides acts as an anvil on the opposite side of the workpiece W while the driven member 204 is applying multiple impacts to the surface 206 of the workpiece W. Further, clamps of various types cooperate with the supports 202 to secure the workpiece W in place during impacting by the driven member 204. The clamps, to be described, are elongated and may extend for the entire length of the support 202 during impacting by the driven member 204. The clamps are positioned to secure each workpiece at a selected location. In each example support that follows. The driven member 204 is being driven by a device, such as the device 210, described above.

Figure 7:
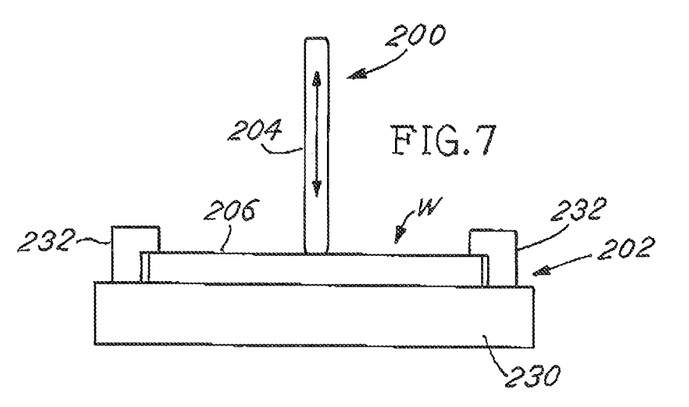
FIG. 7 is a schematic view of one example of a workpiece being held in place by clamps on the surface of a support while impacts are being applied to the workpiece by a driven member.

Referring to FIG. 7, the workpiece W is mounted on a flat plate 230 which is the support 202 for the workpiece W. The impact energy from the driven member 204 moves as a stress wave to the surface 206 of the workpiece. Clamps 232, which are elongated, secure the workpiece W against the flat plate 230 to thereby avoid the compressive forces from the impacting to raise portions of the workpiece W and create a loss of energy.

Figure 8:
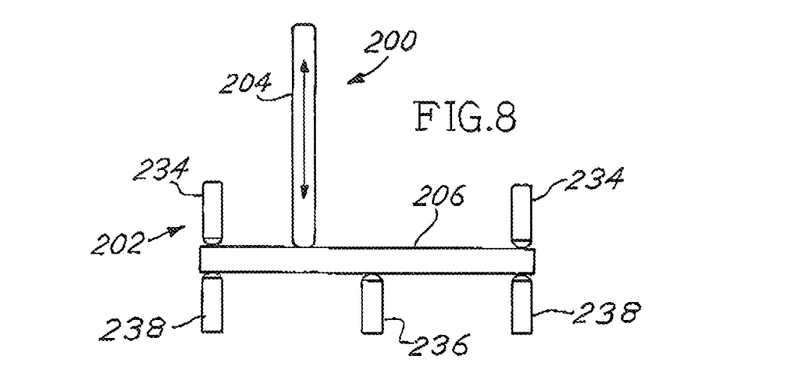
FIG. 8 is a view similar to FIG. 7 of another example of a workpiece being held in place by clamps while impacts are being applied to the workpiece by a driven member.

Referring to FIG. 8, the support 202 comprises a pair of opposed clamps 234, that are elongated and secure the workpiece W to avoid the raising of the workpiece W during impacting. At least one central clamp 236, which is elongated, is mounted on the opposite side of the workpiece W and acts as an anvil in opposition to the impacts from the driven member 204 against the surface 206 of the workpiece W. A stress wave moves through the driven member 204 to the surface 206 of the workpiece W. The resulting energy is then transferred into space on the opposite side of the surface of the workpiece W. A pair of optional clamps 238 may be placed on a side of the surface 206 opposite to the clamps 234. The clamps 234 and the clamps 236 and 238 secure the workpiece W while reducing the loss of energy by the workpiece W during the impacting of the workpiece W by the driven member 204.

Figure 9:
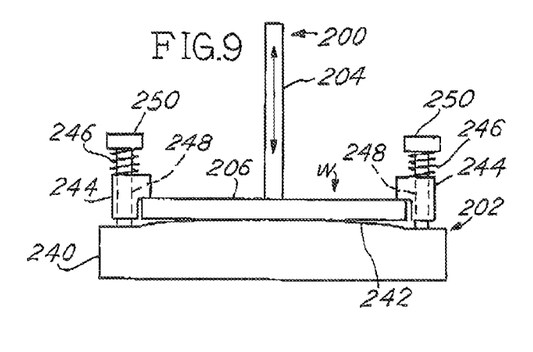
FIG. 9 is a view similar to FIGS. 7 and 8 of still another example of a workpiece resting on a raised anvil surface of a support while being held in place by biasing clamps.

FIG. 9 is another alternative example of supporting a workpiece W wherein a plate 240 is provided with a raised anvil portion 242 which acts in opposition to the driven member 204 impacting the upper surface 206 of the workpiece W. In this example, a pair of biased clamps 244, which are elongated, are provided to secure the workpiece W. Springs 246 bias the clamps 244 to secure the workpiece W against the raised anvil portion 242. The springs 246 are positioned around a fixed post 248 having an upper plate 250. The springs 246 are mounted between the plate 250 and the clamps 244. A stress wave moves through the workpiece W and into the plate 240 while the workpiece W is being secured. The raised portion 242 acts as an opposing anvil to the impacting by the driven member 204 on the surface 206 of the workpiece W.

Figure 10:
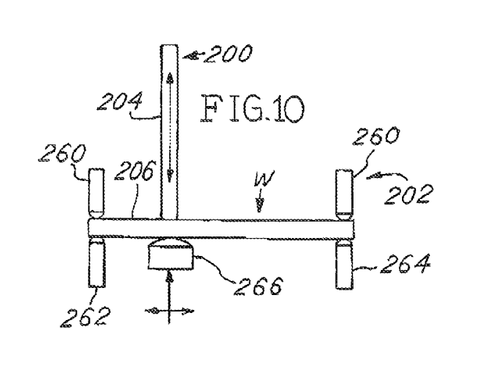
FIG. 10 is yet another example, similar to FIGS. 7-9, of a workpiece being held in place by clamps with a movable anvil opposing a driven member applying impacts to the workpiece.

FIG. 10 is still another example of a support 202 for the workpiece W. Clamps 260, which are elongated, are mounted against the surface 206 of the workpiece W. On the opposite side of the workpiece W, a clamp 262 is provided in opposition to one clamp 260 acting against the opposite surface of the workpiece W. An optional clamp 264, which may also be elongated, is positioned against the opposite side of the workpiece W in opposition to the clamp 260. A movable anvil 266 is mounted in opposition to the driven member 204 at the opposite side of the workpiece W. The anvil 266 is movable in X, Y and Z directions and acts in opposition to the impacting by the driven member 204 against the surface 206. The workpiece W is secured and there is a reduced loss of energy of a stress wave that passes to the upper surface 206 of the workpiece W during impacting by the driven member 204.

Figure 11:
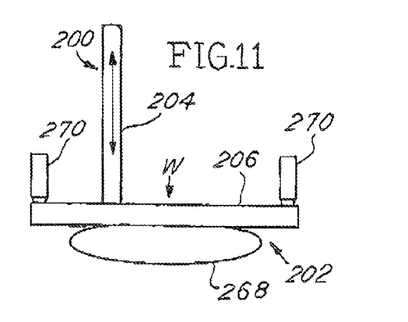
FIG. 11 is yet a further example, similar to FIGS. 7-10, showing an air bladder anvil supporting the lower surface of the workpiece while a drive member applies impacts to the upper surface of the workpiece and while clamps hold the workpiece in place on the anvil.

With reference to FIG. 11, there is still a further example of a support 202 for a workpiece W during processing as the driven member 204 is impacting the surface 206 of the workpiece W. An air bladder anvil 268 is provided on the opposite side of the surface 206 of the workpiece W from the driven member 204 as impacts are applied to the upper surface 206. The air bladder anvil 268, which may be elongated, has an adjustable shape during impacting. A pair of clamps 270, which are elongated, bear against the upper surface 206 of the workpiece W. A reduced loss of energy results by holding the workpiece W while the air bladder anvil 268 absorbs the stress wave.

Figure 12:
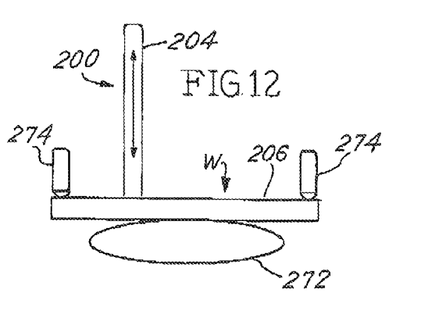
FIG. 12 is a view, similar to FIGS. 7-11, showing another type of air bladder anvil supporting the lower surface of a workpiece and opposing the driven member against a surface of the workpiece while being held in place by clamps.

Referring to FIG. 12, the structure of the support 204 is similar to that of FIG. 11 in that clamps 274, which are elongated, bear against the surface 206 of the workpiece W. The air bladder anvil 272 of this example is a preformed shaped air bladder anvil, as opposed to the adjustable shape of the air bladder anvil 268 of FIG. 11 and functions in a similar manner as the example of FIG. 11. The clamps 274 secure the surface S of the workpiece W to reduce energy loss which is accomplished by all the above examples (FIGS. 7-11). Anvils are provided for each support 202 for reducing the amount of energy lost.

Figure 13:
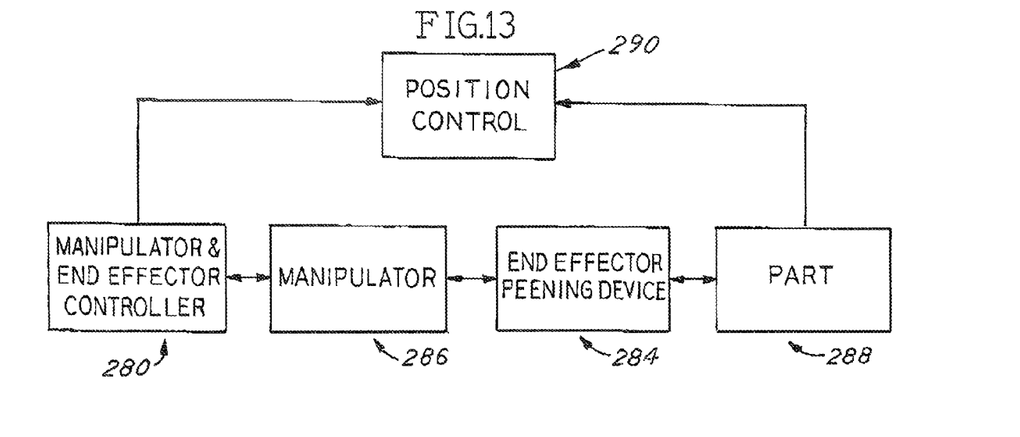
FIG. 13 is a flow diagram representing an apparatus and method for impacting a workpiece.

As stated previously, referring to FIG. 13, a flow diagram is shown wherein a controller 280 is provided for operating a manipulator and an end effector and is represented in the flow diagram box 280 as "Manipulator & End Effector Controller." The device 210 and the driven member 204 are mounted on the end effector 284 for applying multiple impacts at a given frequency against the surface 206 of the workpiece W. The driven member 204 is represented in the flow diagram box 284 as "End Effector Peening Device." A manipulator is provided for locating the end effector and the driven member 204 while the driven member 204 moves across the workpiece W and while impacting the surface 206 of the workpiece W. The workpiece W is identified in the flow diagram box 288 as "Part." A control is identified in the flow diagram box 290 as "Position Control." The method of operation for changing physical characteristics of the workpiece W or "Part" will be described with reference to the flow diagram FIG. 13. Each operating part shown in the flow diagram will be briefly described along with each of their functions while referring also to previously described operating components.

The Position Control 290 locates the position of the workpiece W (Part-Box 290) positioned on a support 202. Once the workpiece W (Part) is securely mounted on the support 202, the position location of the workpiece W is communicated to the Manipulator and End Effector Controller (Box 280). The Manipulator and End Effector Controller 280 receives the workpiece W (Part) position and the path data from the System Control (not shown in the flow diagram of FIG. 13). The Manipulator and End Effector Controller drive a motion control system through a programmed path of travel. The Manipulator and End Effector Controller communicate with the end effector peening device or driven member 204 at the current location of the end effector relative to the workpiece W. The Manipulator locates and controls the end effector to move in a preplanned motion path. The End Effector Peening Device (Box 284) causes the driven member 204 to apply multiple impacts to the workpiece W (Part) as commanded by the Controller (Box 280). The driven member 204 moves across the entire surface 206 of the workpiece W while secured on a support 202 under the control of the end effector and the manipulator which are controlled by the parameters.

In carrying out the method of using the described apparatus for applying impacts to a workpiece W, the workpiece W is securely positioned on a support 202 which may be any one of the above supports 202. The Position Control provides the Manipulator and the End Effector Controller with the position of the workpiece W on the support 204.

The Manipulator and End Effector Controller are provided with the adjustable parameters for changing physical characteristics of the workpiece W into a desired final product. The adjustable parameters for changing physical characteristics of the workpiece include an energy level for the impacts, which may be in the range of 1-35 Joules, on the workpiece W, a rate of application of the impacts on the workpiece W and the coverage area of the impacts on the workpiece W. The impacts are applied by the driven member 204 to the surface of the workpiece W as the end effector and manipulator move the driven member 204 across the entire coverage area or surface 206 of the workpiece W. This occurs when the entire workpiece W or a section thereof has been mounted in a secure position on a support 202, as described above. The device 210 is mounted on the end effector. The driven member 204 of the device 210 is under the control of the Manipulator and End Effecter Controller (Box 280) which further includes the parameters. The impacting is continued until a desired final product has been achieved.

The basic components of both the apparatus and method of the present disclosure have been described above. In selected situations, an added method step and apparatus may be provided for initially pre-loading the workpiece W for forming the workpiece W into a preliminary contour. A description of the pre-loading of the workpiece W for forming a preliminary contour on a workpiece W is described below.

The following disclosure relates generally to impact peening following a pre-loading step. Here the pre-loading provides a more efficient process such as a shortened overall processing time when the pre-loading is performed prior to impacting the workpiece W by the driven member 204. The forming of the workpiece W can be accomplished with less power and more coverage area by the impacting of the workpiece W with the driven member 204 when the workpiece W has been first pre-loaded.

Figure 6:
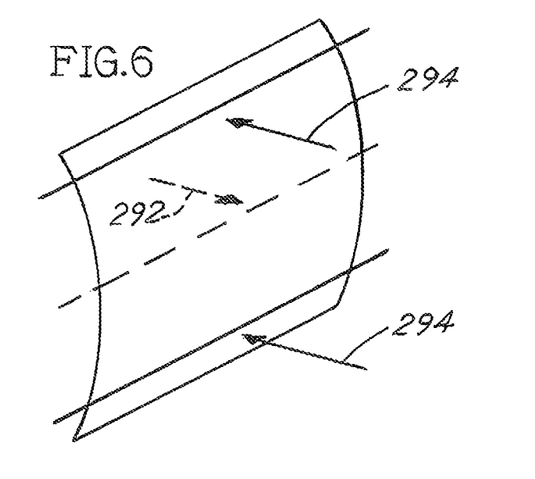
FIG. 6 is a schematic view showing a force being applied on the concave side of a workpiece while being pre-loaded in the fixtures of FIG. 4 or 5.

Referring to FIG. 6, it is schematically shown that by forcibly pressing on the central concave side of a workpiece W, as illustrated by an arrow 292, a desired contour is achieved and may be nearly equivalent to the ultimate contour for the workpiece W. As shown, opposing grippers 302 are applied against the workpiece W as illustrated by arrows 294. As the impacts are applied to the surface 206 of the pre-stressed workpiece W by the driven member 204, as represented by the arrow 292, the pre-loading begins to relax the workpiece W and the contour from the pre-loading is maintained or increased by subsequent multiple impacts.

FIG. 4 shows a fixture, generally 300, that has elongated grippers 302 fixed at the upper outer portion of the fixture 300 and a threaded bolt 304 is located in the lower, central portion 305 of the fixture 300. A workpiece W is formed in the fixture 300 by a forming member 306, having a contoured upper surface 307 on the underside of the workpiece W. The upper/outer zones of the upper surface of the workpiece W are being held by the grippers 302 as the bolt 304 forces the forming member 306 upwardly against the lower surface of the workpiece W to pre-load the workpiece W.

Referring to FIG. 5 an alternate fixture 310 is shown. Like the fixture 300, the construction of the fixture 310 is substantially the same as fixture 300 except FIG. 5 shows the use of a hydraulic piston assembly 312 that drives the forming member 306 against the lower surface of the workpiece W being pre-loaded in the fixture 310. The hydraulic piston assembly 310 is fixed to the underside of the fixture 310 by an outer flange 314 having threaded bolts 316 secured to the underside of the fixture 310. A piston rod 318 is secured to the underside of the contoured forming member 306. Again the upper/outer zones of the upper surface of the workpiece are being held by the grippers 302 as the piston rod 318 forces the forming member 306 upwardly against the lower surface of the workpiece to pre-load the workpiece W.

The workpiece W is first pre-loaded for forming a preliminary contour on the workpiece W, such as shown in FIGS. 4, 5 and 6. The workpiece W or a section of a workpiece is transferred from a pre-loading fixture 300 or 310 to a support 202 for further processing by applying multiple impacts from the driven member 204 against the convex side of the workpiece W. The processing of the pre-loaded workpiece W is then continued in the manner described above relative to multiple impacts applied by the driven member 204 with the impacts being applied to the convex side of the workpiece W, as seen in FIG. 6.

While the disclosure has been described with reference to certain embodiments, it will be understood by those skilled in the art that various changes may be made and equivalents may be substituted without departing from the spirit and scope of the present disclosure. In addition, many modifications may be made to adapt a particular situation or material to the teachings of the present disclosure without departing from its scope. Therefore, it is intended that the present disclosure not be limited to the particular examples disclosed, but that the present disclosure will include all examples falling within the scope of the appended claims.

What is claimed is:

1. Apparatus for changing physical characteristics of a metal workpiece having a surface, the apparatus comprising:
   a support for the workpiece;
   a driven member for applying multiple impacts to a surface of the workpiece; and
   a controller having adjustable parameters operatively connected to the driven member to operate the driven member for applying multiple impacts against the surface of the workpiece within a range of the adjustable parameters for changing physical characteristics of the metal workpiece;
   wherein the support further includes elongated clamps for holding the workpiece on the support for the workpiece.

2. The apparatus of claim 1 wherein the support for the workpiece has a surface and wherein the workpiece has a second surface which bears against the surface of the support.

3. The apparatus of claim 2 wherein the support for the workpiece includes clamps bearing against the surface of the workpiece and the support further includes at least one additional clamp bearing against the second surface of the workpiece.

4. The apparatus of claim 3 wherein the support includes further clamps, the further clamps bear against the second surface of the workpiece and directly oppose the clamps bearing against the surface of the workpiece.

5. The apparatus of claim 1 wherein the support for the workpiece includes a raised surface, the raised surface providing an anvil for opposing the impacts of the driven member against the workpiece.

6. The apparatus of claim 5 wherein the support further includes biased clamps for securing the workpiece on the support and for securing the workpiece against the raised surface of the support.

7. The apparatus of claim 2 wherein the support for the workpiece includes an anvil bearing against the second surface of the workpiece in opposition to the driven member applying impacts to the surface of the workpiece, the anvil being moveable in X, Y, and Z directions for opposing the impacts against the workpiece from the driven member.

8. The apparatus of claim 2 wherein the apparatus includes at least one pair of clamps for bearing against the surface and the second surface of the workpiece during the applying of the multiple impacts to the surface of the workpiece from the driven member.

9. The apparatus of claim 2 wherein the support includes an air bladder anvil bearing against the second surface of the workpiece, and the apparatus further includes a pair of spaced clamps bearing against the surface of the workpiece.

10. The apparatus of claim 9 wherein the air bladder anvil is a preformed and shaped air bladder anvil.

11. The apparatus of claim 1 wherein the apparatus includes a crank mechanism for driving the driven member, the crank mechanism having a continuous reciprocally moving ram, the ram creating energy transformed into impact energy by the driven member, the impact energy moving as a stress wave from the driven member into the surface of the workpiece.

12. The apparatus of claim 1 wherein the adjustable parameters include energy levels of the impacts from the driven member on the workpiece, a rate of application of the impacts by the driven member on the workpiece, and a coverage area of the impacts on the workpiece by the driven member for changing physical characteristics of the metal workpiece.

13. The apparatus of claim 12 wherein the energy levels of the impacts are in the range of 1-35 Joules.

14. The apparatus of claim 1 including a controller, a manipulator and an end effector wherein the controller operates the manipulator and the end effector to have the driven member apply the multiple impacts against the surface of the workpiece within the range of the adjustable parameters.

15. The apparatus of claim 1 including a fixture for pre-loading the workpiece before the driven member applies impacts to the workpiece.

16. A method for changing physical characteristics of a metal workpiece having a surface, the method comprising the steps of:
   supporting the workpiece;
   providing a controller;
   providing the controller with adjustable parameters for changing physical characteristics of the workpiece;
   applying multiple impacts to the surface of the workpiece;
   controlling the applying step with the controller having the adjustable parameters for changing physical characteristics of the workpiece; and
   holding the workpiece on the support using elongated clamps.

17. The method of claim 16 wherein the method further includes securing the workpiece during the supporting step.

18. The method of claim 16 including the further steps of providing a second surface on the workpiece and clamping the surface of the workpiece and of clamping the second surface of the workpiece for directly opposing the clamping of the surface of the workpiece.

19. The method of claim 16 including the step of providing a second surface on the workpiece and providing an anvil bearing against the second surface of the workpiece for opposing the multiple impacts to the surface of the workpiece.

20. The method of claim 16 wherein the method further includes the step of providing biasing clamps for securing the workpiece while supporting the workpiece during the changing of physical characteristics of the workpiece.

21. The method of claim 16 including the step of providing a second surface on the workpiece and providing an anvil for bearing against the second surface of the workpiece in opposition to the multiple impacts to the surface of the workpiece, the anvil being moveable in x, y and z directions for directly opposing the impacts against the workpiece.

22. The method of claim 16 wherein the workpiece has a second surface and the method includes the step of providing an air bladder anvil bearing against the second surface of the workpiece, the method further including the step of clamping the workpiece against the surface of the workpiece.

23. The method of claim 16 wherein the adjustable parameters for changing physical characteristics of the workpiece are energy levels for the impacts on the workpiece, a rate of application of the impacts on the workpiece, and a coverage area of the impacts on the workpiece.

24. The method of claim 23 wherein energy levels are in the range of 1-35 Joules.

25. The method of claim 16 wherein the workpiece has multiple surfaces.

26. A method for changing physical characteristics of a metal workpiece having multiple surfaces until a final metal component is achieved, the method comprising the steps of:
   pre-loading the workpiece for forming a preliminary contour on the workpiece;
   supporting the workpiece having the preliminary contour;
   providing a controller;

providing the controller with adjustable parameters for changing physical characteristics of the workpiece having the preliminary contour;
applying multiple impacts to a surface of the workpiece; and
controlling the applying step with the adjustable parameters for changing physical characteristics of the workpiece until the final metal component is achieved.

27. The method of claim 26 including the step of selecting a surface of the workpiece for the pre-loading step as being a concave side of the workpiece, and providing a fixture for the workpiece during pre-loading.

\* \* \* \* \*